United States Patent
Domprobst et al.

(10) Patent No.: US 12,251,969 B2
(45) Date of Patent: Mar. 18, 2025

(54) TIRE TREAD FOR A HEAVY GOODS VEHICLE TIRE HAVING IMPROVED INCISIONS

(71) Applicant: COMPAGNIE GENERALE DES ETABLISSEMENTS MICHELIN, Clermont-Ferrand (FR)

(72) Inventors: Frédéric Domprobst, Clermont-Ferrand (FR); Etienne Collet, Clermont-Ferrand (FR); Arnaud Larregain, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 410 days.

(21) Appl. No.: 17/416,112

(22) PCT Filed: Dec. 16, 2019

(86) PCT No.: PCT/FR2019/053095
§ 371 (c)(1),
(2) Date: Jun. 18, 2021

(87) PCT Pub. No.: WO2020/128281
PCT Pub. Date: Jun. 25, 2020

(65) Prior Publication Data
US 2022/0072912 A1    Mar. 10, 2022

(30) Foreign Application Priority Data

Dec. 21, 2018 (FR) .......................................... 1873840
Jan. 31, 2019 (FR) ....................................... 1900894

(51) Int. Cl.
*B60C 11/13* (2006.01)

(52) U.S. Cl.
CPC ... *B60C 11/1307* (2013.01); *B60C 2011/1338* (2013.01); *B60C 2200/06* (2013.01)

(58) Field of Classification Search
CPC ......... B60C 2011/1338; B60C 11/0323; B60C 11/1281; B60C 11/1307; B60C 11/1218
See application file for complete search history.

(56) References Cited

U.S. PATENT DOCUMENTS 5,211,781 A * 5/1993 Adam ................. B60C 11/0306
                                                       152/DIG. 3
10,773,556 B2   9/2020 Lawson et al.
(Continued)

FOREIGN PATENT DOCUMENTS

CN      101844487      9/2010
CN      102149548      8/2011
(Continued)

OTHER PUBLICATIONS

NL-2000322-C2 Machine Translation (Year: 2008).*

Primary Examiner — Justin R Fischer
Assistant Examiner — Wendy L Boss
(74) Attorney, Agent, or Firm — COZEN O'CONNOR

(57) ABSTRACT

A tread for a heavy goods vehicle tire, the tread having a surface when new suitable for coming into contact with a road surface, this tread having a plurality of optimized incisions opening onto its tread surface when new, each incision made of at least two narrow portions and wide portions, each narrow portion surrounded by wide portions, the sum of the areas of narrow portions representing at least 40% of the total surface of the incision (and the width being less than 0.4 mm, each portion having a width at least equal to 0.4 mm, this tread being such that for each optimized incision each of the wide portions extending between two narrow portions includes at least one section inclined in a (Continued)

plane parallel to the mid-plane of the optimized incision, and forming an angle at least 15 degrees with the direction of the tread thickness.

15 Claims, 3 Drawing Sheets

(56) References Cited

U.S. PATENT DOCUMENTS

| | | | | |
|---|---|---|---|---|
| 2011/0120610 | A1* | 5/2011 | Fugier | B60C 11/12 |
| | | | | 152/209.21 |
| 2013/0306209 | A1* | 11/2013 | Bonnamour | B60C 11/1218 |
| | | | | 152/209.21 |
| 2016/0272012 | A1* | 9/2016 | Morgan | B60C 11/125 |
| 2016/0318348 | A1* | 11/2016 | Cambon | B60C 11/1307 |
| 2017/0001478 | A1* | 1/2017 | Rolland | B60C 11/1281 |

FOREIGN PATENT DOCUMENTS

| | | | |
|---|---|---|---|
| EP | 0 820 885 | 1/1998 | |
| EP | 2323858 | 9/2008 | |
| FR | 2 921 586 | 4/2009 | |
| JP | 2000/211320 | 8/2000 | |
| JP | 2012 076660 | 4/2012 | |
| NL | 2000322 C2 * | 5/2008 | B60C 11/12 |
| WO | WO 2010/063558 | 6/2010 | |
| WO | WO 2016/054278 | 4/2016 | |
| WO | WO 2018/101933 | 6/2018 | |

* cited by examiner

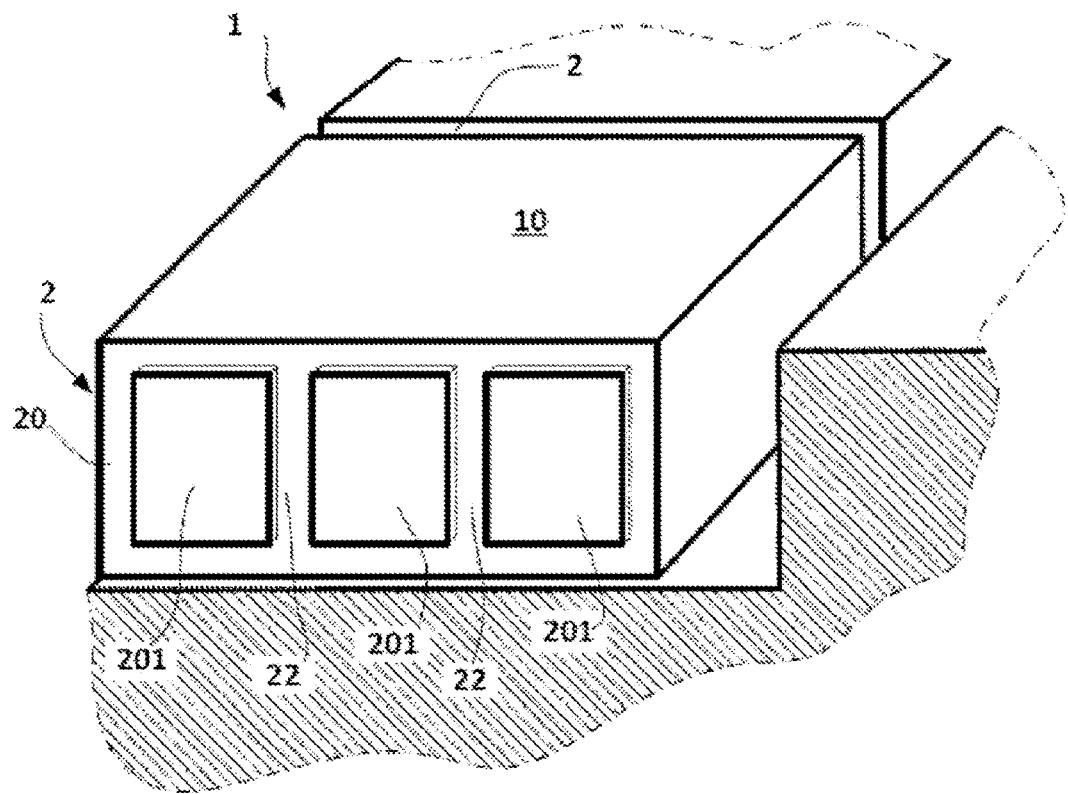
[Fig. 1] PRIOR ART
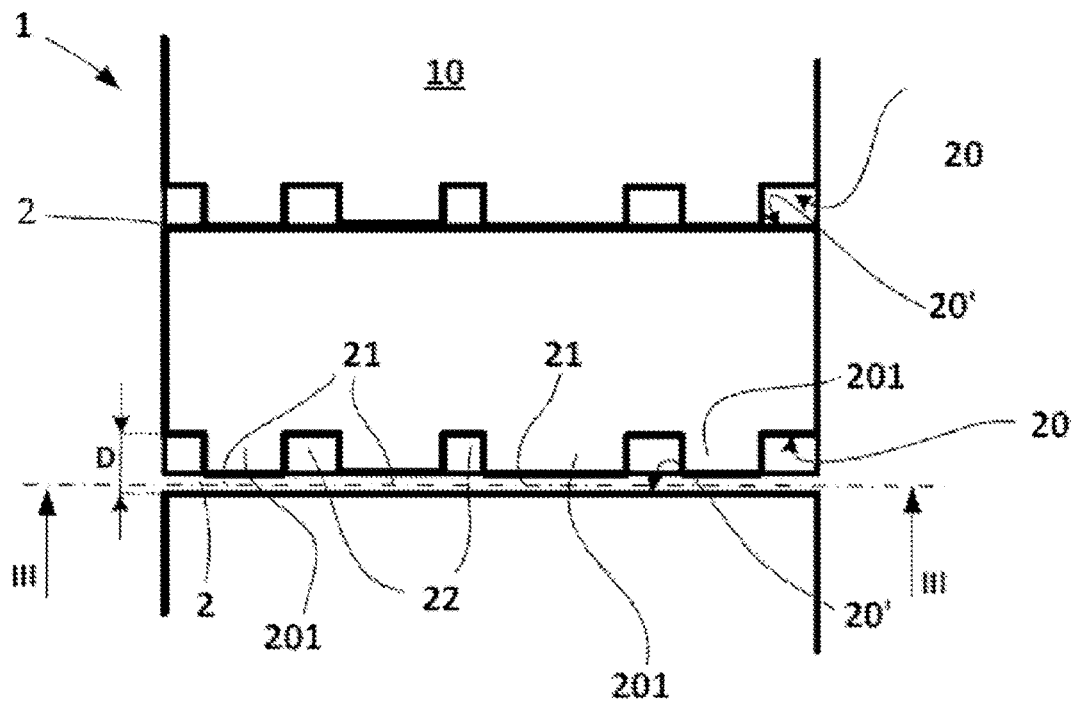
[Fig. 2]

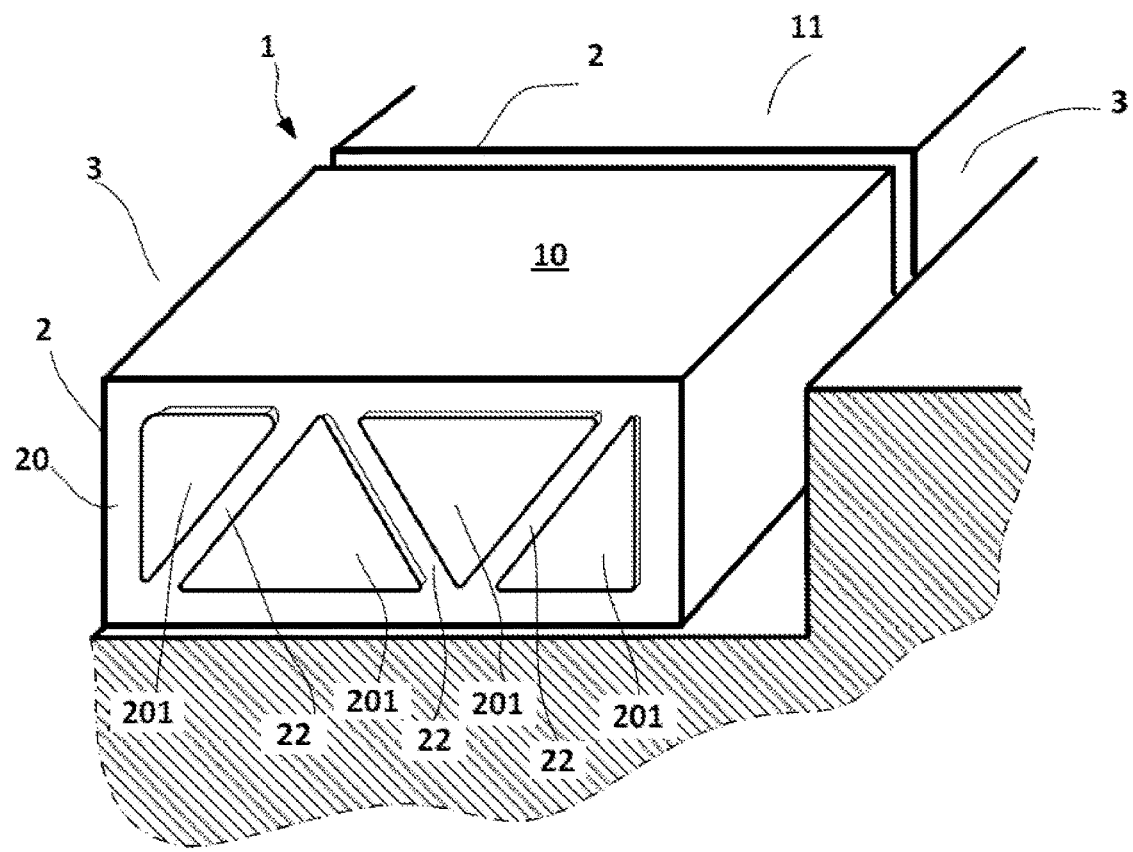
[Fig. 3]
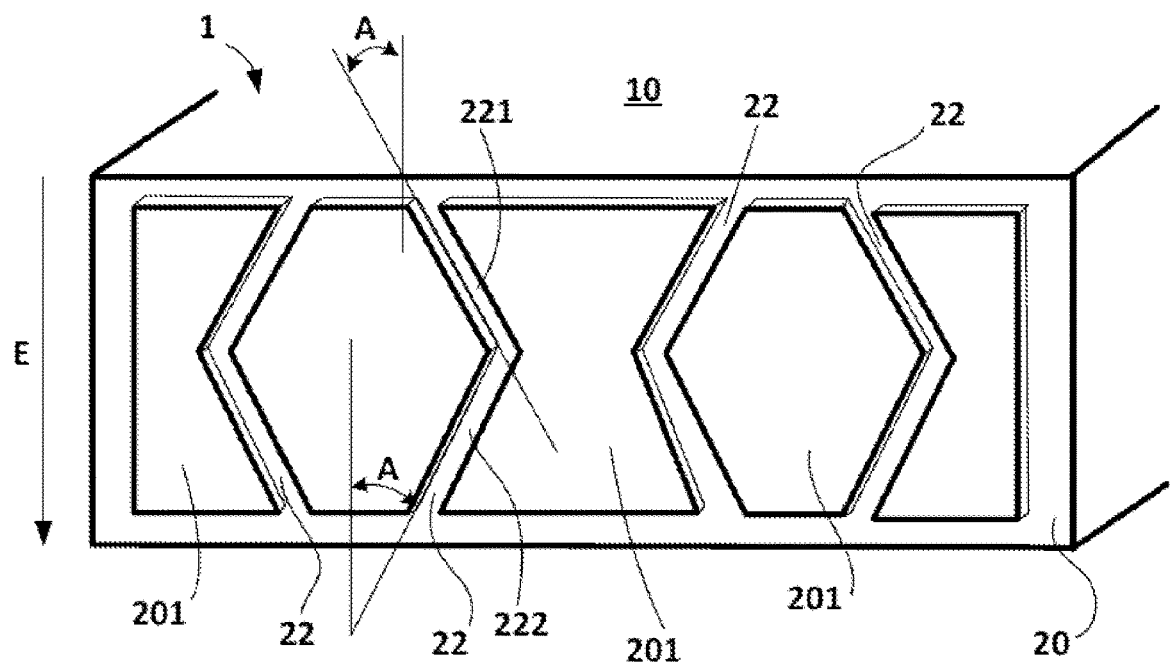
[Fig. 4]

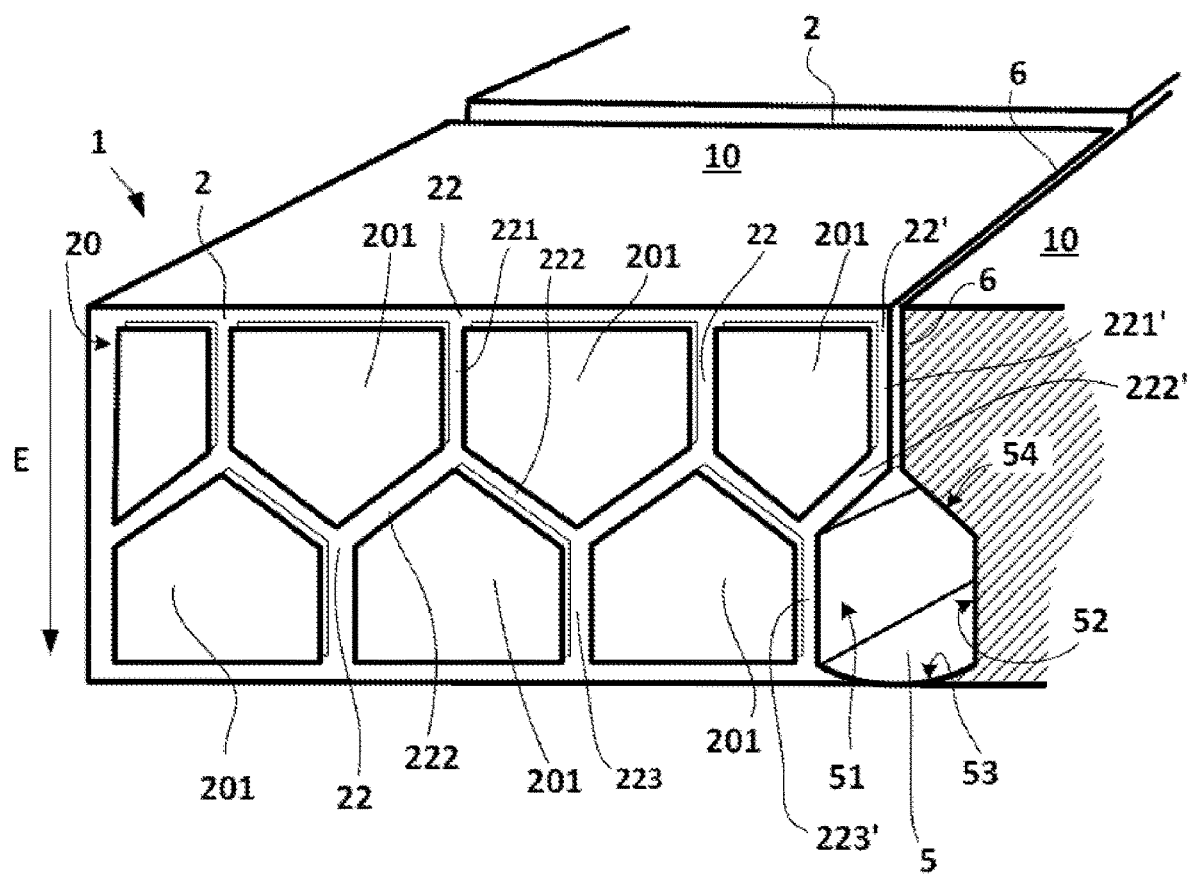
[Fig. 5]

TIRE TREAD FOR A HEAVY GOODS VEHICLE TIRE HAVING IMPROVED INCISIONS

RELATED APPLICATIONS

This is a U.S. National Phase Application under 35 USC 371 of International Application PCT/FR2019/053095 filed on Dec. 16, 2019.

This application claims the priority of French application nos. FR 18/73840 filed Dec. 21, 2018 and FR/1900894 filed Jan. 31, 2019, the entire content of all of which are hereby incorporated by reference.

FIELD OF THE INVENTION

The invention relates to treads for heavy goods vehicle tires and more particularly the treads provided with incisions by means of which the running performance is improved.

Definitions

The tread of a tire denotes the portion of the tire suitable for coming into contact with the road surface by means of a tread surface. This tread wears progressively when the tire is running.

Cut is given to mean any cavity or void produced, particularly by molding, in a tread for a tire, a cut extending both in the depth of the tread and in a main direction, which can be taken to be the direction of flow of the water in the cut during running in rainy weather. This main direction corresponds to the largest dimension of the cut on the tread surface.

Open groove when new is given to mean an open cut on the tread surface of a tread when new, this groove being delimited by facing walls, the mean distance between these walls being appropriate so that these walls are not in contact with each other in normal conditions of use of the tire.

Incision is given to mean a thin cut having a small mean width, this mean width, which corresponds to the mean distance separating the facing walls that delimit it, being such that, in normal conditions of use of the tire, these walls are at least partially in contact with each other when they pass through the region in which the tire makes contact with the road surface. An incision has a main direction, corresponding to the direction of flow of the water in the incision, during running in rainy weather, and a mid-plane, defined by the main direction of the incision and the direction of the thickness of the tread, therefore parallel to the walls of the incision.

Hidden cavity is given to mean a cavity formed under the tread surface when new of the tread, this cavity being suitable for forming a new open groove in the new tread surface generated after predetermined partial wear. A hidden cavity is delimited by two facing side walls, these two side walls being connected to each other by a lower portion forming a bottom and an upper portion continuing radially outwards from these walls. An incision can open up in this upper portion in order to connect the hidden cavity to the tread surface when new. Seen in cross-section, a hidden cavity can have any geometric shape, particularly circular, rectangular or triangular.

In the present description, the terms radial and radially are used to indicate a direction that, when taken on the tire, is a direction perpendicular to the axis of rotation of the tire. This same direction, when taken on a tread only, corresponds to the direction of the thickness of said tread.

In addition, the term circumferential is used to indicate a direction that corresponds to a direction tangent to any circle centered on the axis of rotation of the tire. This circumferential direction corresponds to the longitudinal direction of the tread when it is produced in the form of a flat band before being incorporated into the manufacture of a new tire or the retreading of a worn tire.

The term transverse or axial refers to a direction that is parallel to the direction of the axis of rotation of the tire. This direction is perpendicular to the radial direction and to the circumferential direction. A direction is known as oblique when it forms an angle other than zero with the circumferential or longitudinal direction on a tread.

PRIOR ART

Background of the Invention

During running in rainy weather or on a wet road surface, in order to retain satisfactory performance, contact must be established between the material forming a tread of a tire and the surface on which this tire is running. To this end, it is known practice to provide this tread with a set of grooves and incisions, this set generating both ridges of material and cavities useful for draining away water. The open cavities on the tread surface thus act as a reservoir for collecting and draining away water and thus allow contact between the tread surface of the tire and the road surface. At the same time, the ridges of the grooves and incisions, under the effect of the contact pressure, cut through the film of water present on the road surface in order to locally increase the mechanical grip effect of the tread on the road surface.

It is known practice to make incisions with a small width, constant or otherwise. Given that the benefit of an incision is that it has ridges and that the facing walls that delimit it can come into contact at least partially when they pass through the region in contact with the road surface, in order to limit the reduction in stiffness resulting from the presence of this incision, a person skilled in the art would seek to optimize this contact effect as much as possible. One known means is to make the narrowest possible incisions. However, the industrial manufacturing conditions using fine blades are often a limit on obtaining very narrow incisions (that is, less than 0.4 mm).

Another known means consists of making incisions with a variable width. Such incisions comprise narrow portions and wider portions. The narrow portions are capable of closing when they pass through the region in contact with the road surface, the facing walls of these portions coming into contact with each other over almost their entire surface. In addition, the wide portions are suitable for providing limited drainage of the water present on the contact surface with the road surface. The water thus collected in the wide portions is either discharged to other cavities connected to these wide portions, or discharged by centrifugation out of the region in contact with the road surface.

For example, the document published under reference WO 2016/054278 A1 describes an incision having narrow portions, each narrow portion being surrounded by wide portions, the shape of each narrow portion being generally rectangular. The wide portions have a width at least equal to 0.4 mm (0.4 to 1.9 mm) and the narrow portions have a width less than 0.4 mm (preferably 0.2 mm or 0.1 mm).

In the case of a heavy goods vehicle tire, the aim is to increase the service life on wear and to achieve this a person skilled in the art would strive to optimize the stiffness of the tread by optimizing the voids volume permanently open on the tread surface. To this end, treads have been developed that have some of their open voids when new on the tread surface and some of their voids formed by cavities hidden inside the tread and forming channels. These last cavities are suitable for opening after predetermined partial wear in order to form new additional grooves. Each hidden cavity can be extended by an incision to the tread surface when new, thus facilitating the molding and demolding of the tread. When these channels are oriented circumferentially, incisions transverse to the channels can additionally be formed in order to obtain satisfactory performance, particularly traction and braking performance. EP 2323858 B1 describes such a tire tread for a heavy goods vehicle.

For this type of tread, the optimization of the stiffness must be further improved while retaining satisfactory performance regardless of the running conditions (dry or wet road surface).

SUMMARY OF THE INVENTION

The present invention relates to an improvement in the mechanical operation of the incisions provided on a tire tread for a heavy goods vehicle, these incisions having narrow portions and wide portions, these portions being arranged in a novel manner.

To this end, an embodiment of the invention relates to a tread for a heavy goods vehicle tire comprising a tread surface when new suitable for coming into contact with a road surface during the running of a tire provided with this tread. This tread surface is continuously replaced due to the wear generated by running on the road surface.

This tread comprises a plurality of optimized incisions each having a main direction and a mid-plane, defined by the main direction of the incision and the direction of the thickness of the tread, and opening onto its tread surface when new, each optimized incision comprising two facing walls, suitable for coming into contact with each other when the tread surface passes through the region in which the tire makes contact with the road surface, and being made up of at least two narrow portions and wide portions, each narrow portion being surrounded by wide portions extending along the main direction of the optimized incision.

In addition, the sum of the areas of the narrow portions represents at least 40% of the total surface of the optimized incision, measured in the mid-plane of the optimized incision (that is, the surface of one of the walls delimiting the optimized incision, projected in the mid-plane of the optimized incision) and the width of each of these portions is less than 0.4 mm. Each wide portion has a width at least equal to 0.4 mm. Said widths of narrow portions and wide portions are measured perpendicular to the mid-plane of the optimized incision in the tread surface when new.

This tread is characterized in that, for each optimized incision, each of the wide portions extending between two narrow portions includes at least one section inclined in a plane parallel to the mid-plane of the optimized incision and forming an angle other than zero with the direction of the thickness of the tread.

Due to this arrangement, it is possible to improve the closing of the optimized incision, that is, to obtain better placing in contact of the facing walls delimiting the narrow portions while retaining a drainage capacity in the wide portions. This arrangement makes it possible to optimize the reduction in stiffness of the tread resulting from the presence of incisions.

Preferably, each wide portion or wide portion section forms, in a plane parallel to the mid-plane of the optimized incision, an angle at least equal to 15 degrees with the direction of the thickness of the tread.

According to a preferred variant, each inclined wide portion section between two narrow portions represents at least 30% of the total length of the wide portion measured in a plane parallel to the mid-plane of the optimized incision, between the tread surface when new and the bottom of the optimized incision.

According to one variant embodiment, the narrow portions of the optimized incisions have triangular geometries, the wide portions formed between two narrow portions having an orientation that forms, in a plane parallel to the mid-plane of the optimized incision, an angle at least equal to 15 degrees with the radial direction when the tread is provided on a tire (that is, the direction of the thickness of the tread).

According to another embodiment of an optimized incision, a plurality of wide portions of an incision are formed with at least two inclined sections with different orientations, at least one of these orientations forming, in a plane parallel to the mid-plane of the optimized incision, an angle at least equal to 15 degrees with the direction of the thickness of the tread.

The mean angle of the wide portions or of the inclined wide portion sections relative to the direction of the thickness of the tread is preferably at least equal to 40 degrees.

Advantageously, the difference in width between a narrow portion and a wide portion is at least equal to 0.2 mm, or even more advantageously at least equal to 0.4 mm.

When the tread comprises longitudinally-oriented hidden channels extended towards the tread surface by longitudinal incisions, these longitudinal incisions can advantageously be optimized incisions that comprise narrow portions and wide portions as described above.

When incisions that are transverse or oblique relative to the main direction of a longitudinal hidden channel intersect said hidden channel and the longitudinal incision extending it to the tread surface, the transverse or oblique incisions advantageously consist of narrow portions and wide portions, the wide portions running along the lateral incision and the hidden channel, following the geometry of this longitudinal incision and of this hidden channel as closely as possible.

The main direction of the hidden channel corresponds to the direction of the length of the hidden channel in which water flows during running on a wet road surface. Here, this main direction is longitudinal.

In the case of a tread comprising at least one longitudinally-oriented hidden channel extended towards the tread surface by a longitudinal incision, this tread comprising a plurality of optimized incisions intersecting the hidden channel and the incision extending it to the tread surface, each optimized incision comprising narrow portions and wide portions surrounding the narrow portions, the wide portion running along the longitudinal incision and the hidden channel follows the geometry of this longitudinal incision and of this hidden channel as closely as possible.

According to a variant of the preceding preferred embodiment, the longitudinal incision extending the hidden channel comprises a plurality of narrow portions with a width less than 0.4 mm, each narrow portion being surrounded by wide portions with a width at least equal to 0.4 mm, each of the wide portions extending between two narrow portions including at least one section inclined in a plane parallel to the mid-plane of the optimized incision, at an angle other than zero degrees with the direction of the thickness of the tread.

In the case of the preferred embodiment described above or the variant thereof, even more preferably, each wide portion or wide portion section forms, in a plane parallel to the mid-plane of the optimized incision, an angle at least equal to 15 degrees with the direction of the thickness of the tread.

The invention also relates to a tire provided with a tread including a plurality of optimized incisions consisting of narrow portions and wide portions surrounding the thin portions as described above.

Further features and advantages of the invention will become apparent from the description given below with reference to the appended drawings which show, by way of non-limiting examples, embodiments of the object of the invention.

BRIEF DESCRIPTION OF THE DRAWINGS

FIG. 1 shows an embodiment of an incision according to the prior art;

FIG. 2 shows a tread variant comprising a plurality of optimized incisions according to the invention;

FIG. 3 shows a cross-section along the line III-Ill of the tread shown in FIG. 2;

FIG. 4 shows a second variant of an optimized incision according to the invention;

FIG. 5 shows a third variant of the invention for a tread comprising a hidden channel.

DETAILED DESCRIPTION

In order to facilitate the reading of the figures, the same reference signs are used to describe variants of the invention when these signs refer to elements of the same type, whether this is structural or functional.

FIG. 1 shows an embodiment according to the prior art as described for example in WO 2016/054278 A1. A wall 20 of an incision 2 is shown. Rectangular protuberances 201 are formed on this wall 20, suitable for delimiting narrow portions of the incision 2. Wide portions 22 are molded between these protuberances 201. The other wall delimiting the same incision is not shown here; it can comprise opposite protuberances or be flat. The wide portions 22 have a width at least equal to 0.4 mm and the narrow portions 21 have a width less than 0.4 mm. According to this prior art, the wide portions arranged between the narrow portions are oriented along the direction of the thickness of the tread.

FIG. 2 shows a first variant of an optimized incision according to the invention. This FIG. 2 partially shows the tread surface 10 of a tread 1 when new, a protruding circumferential element of which comprises a plurality of optimized incisions 2, these incisions opening onto the tread surface 10. Two optimized incisions 2 are shown, the one at the bottom of the figure being in an unstressed state outside the region in contact with the road surface and the one at the top of the figure being in a closed state when passing through the region in contact with the road surface.

The optimized incision 2 is delimited by walls 20, 20' that are separated from each other by a maximum distance D that is equal in this case to 0.6 mm. Protuberances 201 are molded on the wall 20, suitable for delimiting narrow incision portions 21 in combination with the wall 20' facing it (here, the wall 20' does not have any protuberances). Wide portions 22 are formed between the narrow portions 21.

FIG. 3 shows one of the walls 20 delimiting the optimized incision 2 shown in FIG. 2. Triangular protuberances 201 are arranged on this wall 20, suitable for reducing the width of the incision to form narrow portions 21. It can be seen in FIG. 3 that the wide portions 22 between two protuberances 201 are inclined relative to the direction of the depth of the incision 2, that is, to the direction of the thickness of the tread here. The narrow portions 21 have a width equal to 0.2 mm. The total area of these narrow portions 21 represents in this case 60% of the total area of the wall 20 delimiting the optimized incision 2.

In order to reduce the stresses and improve the mechanical strength, particularly during the molding and demolding of the tread, the vertices of the protuberances 201 have a rounded geometry.

FIG. 4 shows one wall of a second variant of an optimized incision 2 according to the invention. In this second variant, each wide portion 22 formed between two narrow portions 21 comprises two sections 221, 222 forming a V between them, each section forming an angle A of 30° with the direction of the thickness (direction E in FIG. 4).

FIG. 5 shows one wall of a third variant of an optimized incision 2 according to the invention for a tread comprising a longitudinally-oriented hidden channel 5 (circumferentially-oriented on the tire when the latter is provided with the tread according to the invention).

The hidden channel 5 is delimited by facing walls 51, 52, these walls 51, 52 being joined by a bottom 53 and an upper portion 54. Starting from this upper portion 54, a longitudinal incision 6 extends to the tread surface when new 10. This longitudinal incision 6, which has a small width (at most equal to 0.6 mm) closes at least partially when it passes through the region in contact with the road surface, thus isolating the hidden channel 5 from the outside.

In this third variant, a plurality of optimized incisions 2 are oriented transversely and intersect this assembly formed by the hidden channel 5 and the longitudinal incision 6 that extends it towards the tread surface 10.

FIG. 5 shows a wall 20 of an optimized incision 2, this wall including a plurality of narrow portions delimited by wide portions 22. The narrow portions are formed between a wall 20' of the incision (not shown) and the protuberances 201 locally reducing the width of the optimized incision 2. The area occupied by all of the protuberances 201 is optimum here, and equal to 70% of the area of the wall 20 bearing these protuberances. In this third embodiment, the wide portions 22 form a drainage network and are interconnected to each other at the mid-depth of the optimized incision 2. Each wide portion 22 formed between two narrow portions comprises three sections with different orientations, two sections 221, 223 inclined in the direction of the depth of the incision extending on either side a section 222 inclined at an angle of 45 degrees with the direction E of the depth of the optimized incision 2.

In addition, a wide portion 22' is formed along the hidden channel 5 and the longitudinal incision 6, this wide portion 22' having the particular feature of following the cross-sectional profile of this hidden channel 5 and of the longitudinal incision 6 as closely as possible. "Follow as closely as possible" is given to mean that the geometry of this wide portion 22' comprises a first section 221' parallel to the longitudinal incision 6 and then comprises a section 222' that follows the profile of the upper portion 54 of the hidden channel 5 before continuing with a third section 223' parallel to one of the side walls 51 of said channel 5.

The inclined sections 222, 222' represent, in the case described, 30% of the length of each wide portion 22, 22' respectively.

This geometry of the optimized incision 2 in combination with the presence of at least one hidden channel is particularly beneficial as it makes it possible to have a very high percentage of narrow portions (at least equal to 70%), which makes it possible to obtain an appropriate stiffness while ensuring satisfactory drainage of the tread surface when running in rainy weather.

For this variant, it is of course possible to provide the longitudinal incision 6 extending the hidden channel towards the tread surface with narrow portions and wide portions as described above for the optimized incisions 2.

The invention is not limited to the examples shown and various modifications can be made thereto without departing from the scope of the invention as defined by the claims. In particular, the wide portions formed between the narrow portions can follow curved forms and not straight forms as described above.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tread for a heavy goods vehicle tire comprising a tread surface when new suitable for coming into contact with a road surface when a tire provided with this tread is running, this tread comprising:
   a plurality of optimized incisions each having a main direction and a mid-plane, defined by the main direction of the incision and the direction of a thickness of the tread, and opening onto its tread surface when new, each optimized incision comprising two facing walls, suitable for coming into contact with each other when the tread surface passes through a region in which the tire makes contact with the road surface, and being made up of at least two narrow portions and wide portions extending along the main direction of the optimized incision, each narrow portion being surrounded by wide portions, a sum of areas of the narrow portions representing at least 40% of a total surface of the optimized incision, measured in the mid-plane of the optimized incision, and a width of each of the narrow portions being less than 0.4 mm, each wide portion having a width at least equal to 0.4 mm, said widths of narrow portions and wide portions being measured perpendicular to the mid-plane of the optimized incision in the tread surface when new, wherein, for each optimized incision, each of the wide portions extending between two narrow portions includes at least one section inclined in a plane parallel to the mid-plane of the optimized incision and forming an angle other than zero degrees with the direction of the thickness of the tread, said tread further comprising at least one longitudinally-oriented hidden channel extending towards the tread surface by a longitudinal incision, the plurality of optimized incisions transversally intersecting the hidden channel and the incision extending it to the tread surface, the wide portion running along the longitudinal incision and the hidden channel following a geometry of the longitudinal incision and of the hidden channel,
   wherein one of:
      the optimized incision having two rows of pentagonal protuberance, each having two parallel edges orthogonal to a third edge, and
      the optimized incision having a single row of hexagonal protuberances, where adjacent protuberances include a convex hexagon and a concave hexagon that form two straight wide portions therebetween.

2. The tread as claimed in claim 1, wherein each wide portion forms, in a plane parallel to the mid-plane of the optimized incision, an angle at least equal to 15 degrees with the direction of the thickness of the tread.

3. The tread as claimed in claim 1, wherein, for each wide portion, the inclined section represents at least 30% of a total length of the wide portion measured in a plane parallel to the mid-plane of the optimized incision, between the tread surface when new and a bottom of the optimized incision.

4. The tread as claimed in claim 1, wherein the longitudinal incision extending the hidden channel comprises a plurality of second narrow portions with a width less than 0.4 mm, each second narrow portion being surrounded by second wide portions with a width at least equal to 0.4 mm, each of the second wide portions extending between two second narrow portions including at least one section inclined in a plane parallel to the mid-plane of the longitudinal incision, at an angle other than zero degrees with the direction of the thickness of the tread.

5. The tread as claimed in claim 4, wherein each second wide portion forms, in a plane parallel to the mid-plane of the longitudinal incision, an angle at least equal to 15 degrees with the direction of the thickness of the tread.

6. A tire for a heavy goods vehicle including a tread as claimed in claim 1.

7. The tread as claimed in claim 1, wherein at least one wide portion formed between three narrow portions, in a plane parallel to the mid-plane of the optimized incision, has at least three straight sections at different orientations.

8. The tread as claimed in claim 1, the narrow portions being formed by two rows of intermeshed protuberances.

9. The tread as claimed in claim 8, the narrow portions representing at least 70% of the total surface of the optimized incision, measured in the mid-plane of the optimized incision.

10. The tread as claimed in claim 9, the wide portions being interconnected to each other at a mid-depth of the optimized incision to form a drainage network connected to a hidden channel.

11. The tread as claimed in claim 1, wherein at least one wide portion formed between two narrow portions, in a plane parallel to the mid-plane of the optimized incision, has at least two straight sections at different orientations, at least one of the orientations forming, in a plane parallel to the mid-plane of the optimized incision, an angle at least equal to 15 degrees with the direction of the thickness of the tread.

12. A tread for a heavy goods vehicle tire comprising a tread surface when new suitable for coming into contact with a road surface when a tire provided with this tread is running, this tread comprising:
   a plurality of optimized incisions each having a main direction and a mid-plane, defined by the main direction of the incision and the direction of a thickness of the tread, and opening onto its tread surface when new, each optimized incision comprising two facing walls, suitable for coming into contact with each other when the tread surface passes through a region in which the tire makes contact with the road surface, and being made up of at least two narrow portions and wide portions extending along the main direction of the optimized incision, each narrow portion being surrounded by wide portions, a sum of areas of the narrow portions representing at least 40% of a total surface of the optimized incision, measured in the mid-plane of the optimized incision, and a width of each of the narrow portions being less than 0.4 mm, each wide portion having a width at least equal to 0.4 mm, said widths of narrow portions and wide portions being measured perpendicular to the mid-plane of the optimized incision in the tread surface when new, wherein, for each optimized incision, each of the wide portions extending between two narrow portions includes at least one section inclined in a plane parallel to the mid-plane of the optimized incision and forming an angle other than zero degrees with the direction of the thickness of the tread, said tread further comprising at least one longitudinally-oriented hidden channel extending towards the tread surface by a longitudinal incision, the plurality of optimized incisions transversally intersecting the hidden channel and the incision extending it to the tread surface, the wide portion running along the longitudinal incision and the hidden channel following a geometry of the longitudinal incision and of the hidden channel, the optimized incision having a single row of triangular protuberances oriented to form the wide portions with straight parallel edges.

13. The tread as claimed in claim 12, the narrow portions representing at least 60% of the total surface of the optimized incision, measured in the mid-plane of the optimized incision.

14. The tread as claimed in claim 13, the wide portions formed between two narrow portions having two straight sections forming a V, each of the straight sections being at an angle of 30 degrees with the direction of the thickness of the tread.

15. A tread for a heavy goods vehicle tire comprising a tread surface when new suitable for coming into contact with a road surface when a tire provided with this tread is running, this tread comprising:

a plurality of optimized incisions each having a main direction and a mid-plane, defined by the main direction of the incision and the direction of a thickness of the tread, and opening onto its tread surface when new, each optimized incision comprising two facing walls, suitable for coming into contact with each other when the tread surface passes through a region in which the tire makes contact with the road surface, and being made up of at least two narrow portions and wide portions extending along the main direction of the optimized incision, each narrow portion being surrounded by wide portions, a sum of areas of the narrow portions representing at least 40% of a total surface of the optimized incision, measured in the mid-plane of the optimized incision, and a width of each of the narrow portions being less than 0.4 mm, each wide portion having a width at least equal to 0.4 mm, said widths of narrow portions and wide portions being measured perpendicular to the mid-plane of the optimized incision in the tread surface when new, wherein, for each optimized incision, each of the wide portions extending between two narrow portions includes at least one section inclined in a plane parallel to the mid-plane of the optimized incision and forming an angle other than zero degrees with the direction of the thickness of the tread, said tread further comprising at least one longitudinally-oriented hidden channel extending towards the tread surface by a longitudinal incision, the plurality of optimized incisions transversally intersecting the hidden channel and the incision extending it to the tread surface, the wide portion running along the longitudinal incision and the hidden channel following a geometry of the longitudinal incision and of the hidden channel, wherein the narrow portions of the optimized incisions have triangular geometries, the wide portions formed between two narrow portions having straight sections with parallel edges forming, in a plane parallel to the mid-plane of the optimized incision, an angle at least equal to 15 degrees with the direction of the thickness of the tread.

* * * * *